United States Patent
Wu et al.

(10) Patent No.: US 9,785,313 B2
(45) Date of Patent: Oct. 10, 2017

(54) PROVIDING A DISTRACTION FREE READING MODE WITH AN ELECTRONIC PERSONAL DISPLAY

(71) Applicant: RAKUTEN KOBO, INC., Toronto (CA)

(72) Inventors: James Wu, Newmarket (CA); Peter James Farmer, Toronto (CA); Michael Serbinis, Toronto (CA); Pamela Lynn Hilborn, Toronto (CA)

(73) Assignee: RAKUTEN KOBO, INC., Toronto (CA)

( * ) Notice: Subject to any disclaimer, the term of this patent is extended or adjusted under 35 U.S.C. 154(b) by 0 days.

(21) Appl. No.: 13/931,425

(22) Filed: Jun. 28, 2013

(65) Prior Publication Data

US 2015/0006876 A1 Jan. 1, 2015

(51) Int. Cl.

| G06F 3/00 | (2006.01) |
|---|---|
| G06F 13/12 | (2006.01) |
| G06F 3/048 | (2013.01) |
| G06F 3/14 | (2006.01) |
| G06F 9/46 | (2006.01) |
| G06F 3/0483 | (2013.01) |
| G06F 9/445 | (2006.01) |
| G06F 3/0488 | (2013.01) |

(52) U.S. Cl.
CPC .......... *G06F 3/0483* (2013.01); *G06F 3/0488* (2013.01); *G06F 9/44505* (2013.01); *G06F 2203/04808* (2013.01)

(58) Field of Classification Search
CPC .. G06F 3/0483; G06F 9/44505; G06F 3/0488; G06F 9/44; G06F 9/4411; G06F 13/385; G06F 9/526
USPC ..... 710/8, 14–15, 18, 62; 345/184; 715/716, 715/752, 864; 340/5.83, 670; 718/104
See application file for complete search history.

(56) References Cited

U.S. PATENT DOCUMENTS

| 8,306,989 | B2 | 11/2012 | Yach et al. | |
|---|---|---|---|---|
| 8,644,971 | B2 | 2/2014 | Weinstein | |
| 9,176,608 | B1 * | 11/2015 | Baldwin | G09G 5/00 |
| 2002/0188441 | A1 * | 12/2002 | Matheson | G06F 9/4443 704/202 |
| 2004/0209594 | A1 * | 10/2004 | Naboulsi | 455/404.1 |
| 2005/0253823 | A1 * | 11/2005 | Kazama et al. | 345/184 |
| 2008/0177994 | A1 * | 7/2008 | Mayer | G06F 9/4418 713/2 |
| 2011/0109468 | A1 * | 5/2011 | Hirschfeld et al. | 340/670 |
| 2011/0112671 | A1 * | 5/2011 | Weinstein | 700/94 |
| 2011/0191692 | A1 * | 8/2011 | Walsh | G06F 3/00 715/752 |
| 2011/0209203 | A1 * | 8/2011 | Shafer | G06F 21/604 726/4 |
| 2011/0214132 | A2 * | 9/2011 | Yach et al. | 719/318 |

(Continued)

*Primary Examiner* — Farley Abad
*Assistant Examiner* — Henry Yu
(74) *Attorney, Agent, or Firm* — Oblon, McClelland, Maier & Neustadt, L.L.P.

(57) ABSTRACT

A method and system for providing a distraction free reading mode with an electronic personal display is disclosed. One example accesses non-adjustable settings for a reader mode. In addition, user adjustable settings for the reader mode on the electronic personal display are also accessed. The user adjustable settings and the non-adjustable settings are then implemented when the reader mode is initiated.

22 Claims, 6 Drawing Sheets

(56) References Cited

U.S. PATENT DOCUMENTS

| | | | |
|---|---|---|---|
| 2011/0289506 A1* | 11/2011 | Trivi | G06F 9/526 718/104 |
| 2012/0081270 A1* | 4/2012 | Gimpl | G06F 1/1616 345/1.3 |
| 2012/0169465 A1* | 7/2012 | Chang et al. | 340/5.83 |
| 2013/0031477 A1* | 1/2013 | Bilinski et al. | 715/716 |
| 2013/0040560 A1* | 2/2013 | Kennedy | H04M 1/7253 455/41.1 |
| 2013/0073449 A1* | 3/2013 | Voynow | G06Q 30/0601 705/39 |
| 2013/0332721 A1* | 12/2013 | Chaudhri et al. | 713/100 |
| 2014/0002473 A1* | 1/2014 | Mese et al. | 345/589 |
| 2014/0068755 A1* | 3/2014 | King | G06F 21/53 726/19 |

* cited by examiner

PROVIDING A DISTRACTION FREE READING MODE WITH AN ELECTRONIC PERSONAL DISPLAY

BACKGROUND

An electronic personal display is a handheld mobile electronic device that displays information to a user. While an electronic personal display may be capable of many of the functions of a personal computer, a user can typically interact directly with an electronic personal display without the use of a keyboard that is separate from or coupled to but distinct from the electronic personal display itself. Some examples of electronic personal displays include mobile digital devices/tablet computers such as (e.g., Apple iPad®, Microsoft® Surface™, Samsung Galaxy Tab® and the like), handheld multimedia smartphones (e.g., Apple iPhone®, Samsung Galaxy S®, and the like), and handheld electronic readers (e.g., AmazonKindle®, Barnes and Noble Nook®, Kobo Aura HD, and the like).

An electronic reader, also known as an eReader, is an electronic personal display that is used for reading electronic books (eBooks), electronic magazines, and other digital content. For example, digital content of an eBook is displayed as alphanumeric characters and/or graphic images on a display of an eReader such that a user may read the digital content much in the same way as reading the analog content of a printed page in a paper-based book. An eReader provides a convenient format to store, transport, and view a large collection of digital content that would otherwise potentially take up a large volume of space in traditional paper format.

In some instances, eReaders are purpose built devices designed to perform especially well at displaying alphanumeric digital content (i.e., text). For example, a purpose built eReader may include a display that reduces glare, performs well in high light conditions, and/or mimics the look of printed text on actual paper. While such purpose built eReaders may excel at displaying alphanumeric digital content for a user to read, they may also perform other functions, such as displaying graphic images, emitting audio, capturing audio, capturing digital images, and web surfing, among others.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DESCRIPTION OF EMBODIMENTS

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "accessing", "implementing", "initiating", "providing", "receiving", or the like, often refer to the actions and processes of an electronic computing device/system, such as an electronic reader ("eReader"), electronic personal display, and/or a mobile (i.e., handheld) multimedia device/smartphone, mobile digital device/tablet computer among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

Overview of Discussion

In the following discussion a distraction-free reading mode is disclosed. In one embodiment, reader mode targets alerts, reminders, ads, and the like that might normally be generated during device operating mode and presented via the device user interface (UI), but when reading, would comprise a distraction and an intrusion. In general, the reader mode temporarily pre-empts distractions generated via the device UI.

For example, reading mode is an easily accessible option that allows the reader to customize the device settings for an uninterrupted, optimized reading experience. Reading mode can quell notifications, mute sounds (and vibrations, if applicable), reduce screen brightness, disable radios, adjust reading experience settings (fonts, margins, leading etc.) and the like.

In one embodiment, the user can fine tune the settings in reading mode and then enable it with a single touch/gesture to immediately enter an optimized, personalized and distraction-free environment for reading. In one embodiment the settings are globally available in the settings area. Additionally, there may also be a subtle onscreen reminder that reading mode has been engaged. The reminder could include an icon in the status bar, and/or a message/icon on the lock screen. Moreover, if the user tries to use features that are in conflict with reading mode (e.g., manually adjust brightness, go on the web with Wi-Fi disabled, adjust volume when muted) they would be reminded that reading mode is enabled. In one embodiment, if the user tries to use features that are in conflict with reading mode, they will also be provided with an option to turn it off.

Discussion will begin with description of an example eReader and various components that may be included in some embodiments of an eReader. Various display and touch sensing technologies that may be utilized with some embodiments of an eReader will then be described. An example computing system, which may be included as a component of an eReader, will then be described. Operation of an example eReader and several of its components will then be described in more detail in conjunction with a description of an example method of reducing ambient noise distraction with an electronic reader.

Example Electronic Reader (eReader)

Figure 1A:
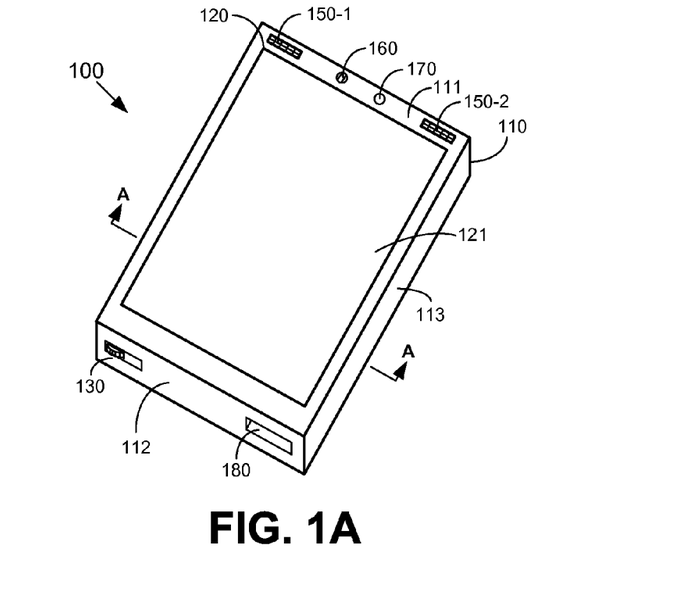
FIG. 1A shows a front perspective view of an electronic reader (eReader), in accordance with various embodiments.

FIG. 1A shows a front perspective view of an eReader 100, in accordance with various embodiments. In general, eReader 100 is one example of an electronic personal display. Although an eReader is discussed specifically herein for purposes of example, concepts discussed are equally applicable to other types of electronic personal displays such as, but not limited to, mobile digital devices/tablet computers and/or multimedia smart phones. As depicted, eReader 100 includes a display 120, a housing 110, and some form of on/off switch 130. In some embodiments, eReader 100 may further include one or more of: speakers 150 (150-1 and 150-2 depicted), microphone 160, digital camera 170, and removable storage media slot 180. Section lines depict a region and direction of a section A-A which is shown in greater detail in FIG. 2.

Housing 110 forms an external shell in which display 120 is situated and which houses electronics and other components that are included in an embodiment of eReader 100. In FIG. 1A, a front surface 111, a bottom surface 112, and a right side surface 113 are visible. Although depicted as a single piece, housing 110 may be formed of a plurality of joined or inter-coupled portions. Housing 110 may be formed of a variety materials such as plastics, metals, or combinations of different materials.

Display 120 has an outer surface 121 (sometimes referred to as a bezel) through which a user may view digital contents such as alphanumeric characters and/or graphic images that are displayed on display 120. Display 120 may be any one of a number of types of displays including, but not limited to: a liquid crystal display, a light emitting diode display, a plasma display, a bistable display (using electrophoretic technology), or other display suitable for creating graphic images and alphanumeric characters recognizable to a user.

On/off switch 130 is utilized to power on/power off eReader 100. On/off switch 130 may be a slide switch (as depicted), button switch, toggle switch, touch sensitive switch, or other switch suitable for receiving user input to power on/power off eReader 100.

Speaker(s) 150, when included, operates to emit audible sounds from eReader 100. A speaker 150 may reproduce sounds from a digital file stored on or being processed by eReader 100 and/or may emit other sounds as directed by a processor of eReader 100.

Microphone 160, when included, operates to receive audible sounds from the environment proximate eReader 100. Some examples of sounds that may be received by microphone 160 include voice, music, and/or ambient noise in the area proximate eReader 100. Sounds received by microphone 160 may be recorded to a digital memory of eReader 100 and/or processed by a processor of eReader 100.

Digital camera 170, when included, operates to receive images from the environment proximate eReader 100. Some examples of images that may be received by digital camera 170 include an image of the face of a user operating eReader 100 and/or an image of the environment in the field of view of digital camera 170. Images received by digital camera 170 may be still or moving and may be recorded to a digital memory of eReader 100 and/or processed by a processor of eReader 100.

Removable storage media slot 180, when included, operates to removably couple with and interface to an inserted item of removable storage media, such as a non-volatile memory card (e.g., MultiMediaCard ("MMC"), a secure digital ("SD") card, or the like). Digital content for play by eReader 100 and/or instructions for eReader 100 may be stored on removable storage media inserted into removable storage media slot 180. Additionally or alternatively, eReader 100 may record or store information on removable storage media inserted into removable storage media slot 180.

Figure 1B:
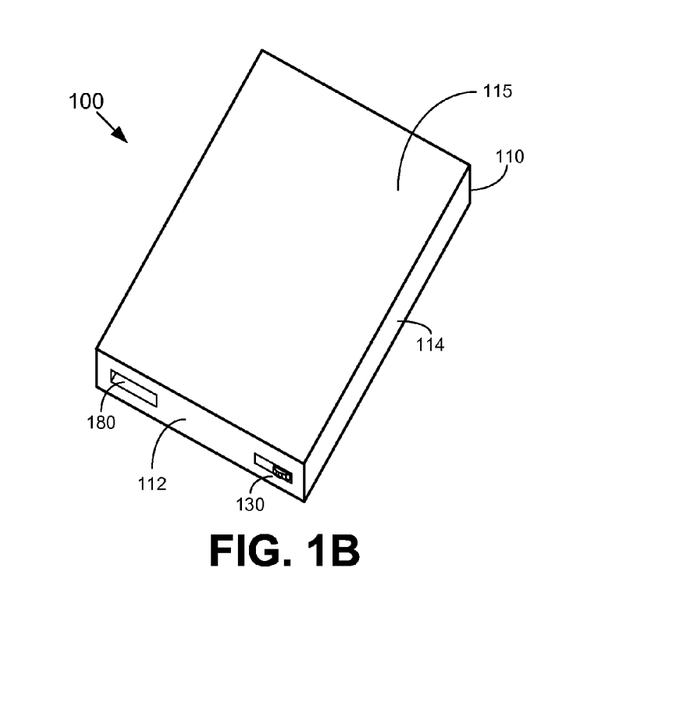
FIG. 1B shows a rear perspective view of the eReader of FIG. 1A, in accordance with various embodiments.

FIG. 1B shows a rear perspective view of eReader 100 of FIG. 1A, in accordance with various embodiments. In FIG. 1B, a rear surface 115 of the non-display side of the housing 110 of eReader 100 is visible. Also visible in FIG. 1B is a left side surface 114 of housing 110. It is appreciated that housing 110 also includes a top surface which is not visible in either FIG. 1A or FIG. 1B.

Figure 2:
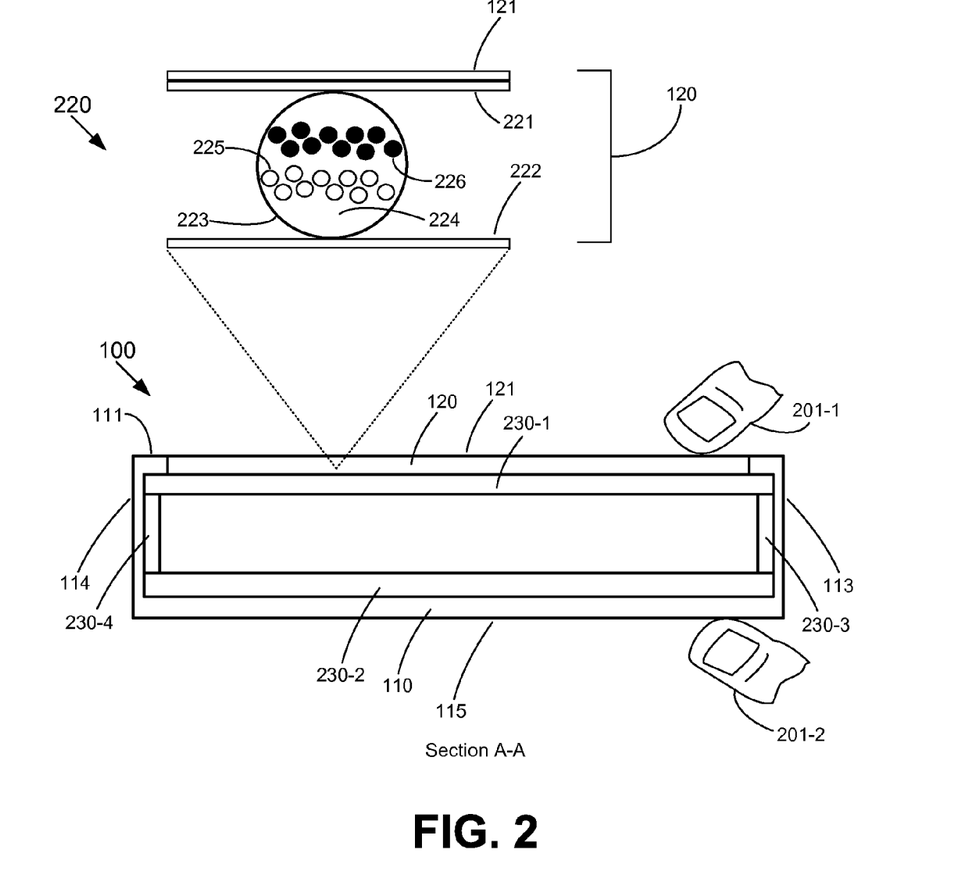
FIG. 2 shows a cross-section of the eReader of FIG. 1A along with a detail view of a portion of the display of the eReader, in accordance with various embodiments.

FIG. 2 shows a cross-section A-A of eReader 100 along with a detail view 220 of a portion of display 120, in accordance with various embodiments. In addition to display 120 and housing 110, a plurality of touch sensors 230 are visible and illustrated in block diagram form. It should be appreciated that a variety of well-known touch sensing technologies may be utilized to form touch sensors 230 that are included in embodiments of eReader 100; these include, but are not limited to: resistive touch sensors; capacitive touch sensors (using self and/or mutual capacitance); inductive touch sensors; and infrared touch sensors. In general, resistive touch sensing responds to pressure applied to a touched surface and is implemented using a patterned sensor design on, within, or beneath display 120, rear surface 115, and/or other surface of housing 110. In general, inductive touch sensing requires the use of a stylus and are implemented with a patterned electrode array disposed on, within, or beneath display 120, rear surface 115, and/or other surface of housing 110 In general, capacitive touch sensing utilizes a patterned electrode array disposed on, within, or beneath display 120, rear surface 115, and/or other surface of housing 110; and the patterned electrodes sense changes in capacitance caused by the proximity or contact by an input object. In general, infrared touch sensing operates to sense an input object breaking one or more infrared beams that are projected over a surface such as outer surface 121, rear surface 115, and/or other surface of housing 110.

Once an input object interaction is detected by a touch sensor 230, it is interpreted either by a special purpose processor (e.g., an application specific integrated circuit (ASIC)) that is coupled with the touch sensor 230 and the interpretation is passed to a processor of eReader 100, or a processor of eReader is used to directly operate and/or interpret input object interactions received from a touch sensor 230. It should be appreciated that in some embodiments, patterned sensors and/or electrodes may be formed of optically transparent material such as very thin wires or a material such as indium tin oxide (ITO).

In various embodiments one or more touch sensors 230 (230-1 front; 230-2 rear; 230-3 right side; and/or 230-4 left side) may be included in eReader 100 in order to receive user input from input object such 201 such as styli or human digits. For example, in response to proximity or touch contact with outer surface 121 or coversheet (not illustrated) disposed above outer surface 121, user input from one or more fingers such as finger 201-1 may be detected by touch sensor 230-1 and interpreted. Such user input may be used to interact with graphical content displayed on display 120 and/or to provide other input through various gestures (e.g., tapping, swiping, pinching digits together on outer surface 121, spreading digits apart on outer surface 121, or other gestures).

In a similar manner, in some embodiments, a touch sensor 230-2 may be disposed proximate rear surface 115 of housing 110 in order to receive user input from one or more input objects 201, such as human digit 201-2. In this manner, user input may be received across all or a portion of the rear surface 115 in response to proximity or touch contact with rear surface 115 by one or more user input objects 201. In some embodiments, where both front (230-1) and rear (230-2) touch sensors are included, a user input may be received and interpreted from a combination of input object interactions with both the front and rear touch sensors.

In a similar manner, in some embodiments, a left side touch sensor 230-3 and/or a right side touch sensor 230-4, when included, may be disposed proximate the respective left and/or right side surfaces (113, 114) of housing 110 in order to receive user input from one or more input objects 201. In this manner, user input may be received across all or a portion of the left side surface 113 and/or all or a portion of the right side surface 114 of housing 110 in response to proximity or touch contact with the respective surfaces by or more user input objects 201. In some embodiments, instead of utilizing a separate touch sensor, a left side touch sensor 230-3 and/or a right side touch sensor 230-4 may be a continuation of a front touch sensor 230-1 or a rear touch sensor 230-2 which is extended so as to facilitate receipt proximity/touch user input from one or more sides of housing 110.

Although not depicted, in some embodiments, one or more touch sensors 230 may be similarly included and situated in order to facilitate receipt of user input from proximity or touch contact by one or more user input objects 201 with one or more portions of the bottom 112 and/or top surfaces of housing 110.

Referring still to FIG. 2, a detail view 220 is show of display 120, according to some embodiments. Detail 220 depicts a portion of a bistable electronic ink that is used, in some embodiments, when display 120 is a bistable display. In some embodiments, a bistable display is utilized in eReader 100 as it presents a paper and ink like image and/or because it is a reflective display rather than an emissive display and thus can present a persistent image on display 120 even when power is not supplied to display 120. In one embodiment, a bistable display comprises electronic ink the form of millions of tiny optically clear capsules 223 that are filled with an optically clear fluid 224 in which positively charged white pigment particles 225 and negatively charged black pigment particles 226 are suspended. The capsules 223 are disposed between bottom electrode 222 and a transparent top electrode 221. A transparent/optically clear protective surface is often disposed over the top of top electrode 221 and, when included, this additional transparent surface forms outer surface 121 of display 120 and forms a touch surface for receiving touch inputs. It should be appreciated that one or more intervening transparent/optically clear layers may be disposed between top electrode 221 and top electrode 221. In some embodiments, one or more of these intervening layers may include a patterned sensor and/or electrodes for touch sensor 230-1. When a positive or negative electric field is applied proximate to each of bottom electrode 222 and top electrode 221 in regions proximate capsule 223, pigment particles of opposite polarity to a field are attracted to the field, while pigment particles of similar polarity to the applied field are repelled from the field. Thus, when a positive charge is applied to top electrode 221 and a negative charge is applied to bottom electrode 221, black pigment particles 226 rise to the top of capsule 223 and white pigment particles 225 go to the bottom of capsule 223. This makes outer surface 121 appear black at the point above capsule 223 on outer surface 121. Conversely, when a negative charge is applied to top electrode 221 and a positive charge is applied to bottom electrode 221, white pigment particles 225 rise to the top of capsule 223 and black pigment particles 226 go to the bottom of capsule 223. This makes outer surface 121 appear white at the point above capsule 223 on outer surface 121. It should be appreciated that variations of this technique can be employed with more than two colors of pigment particles.

Figure 3:
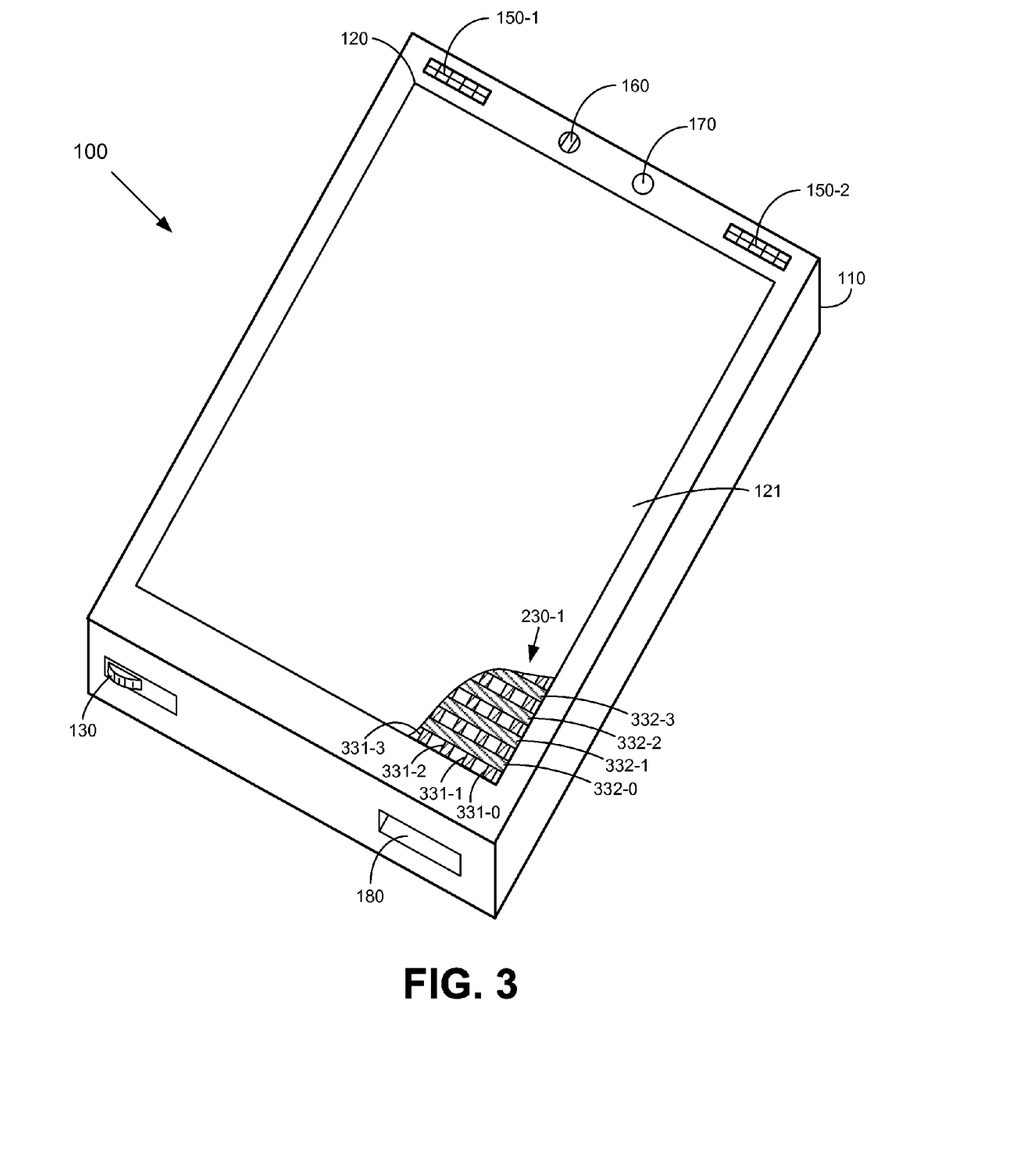
FIG. 3 shows a cutaway view of an eReader illustrating one example of a touch sensor, in accordance with an embodiment.

FIG. 3 shows a cutaway view of an eReader illustrating one example of a touch sensor 230, in accordance with an embodiment. In FIG. 3, a portion of display 120 has been removed such that a portion of underlying top sensor 230-1 is visible. As depicted, in one embodiment, top touch sensor 230-1 is illustrated as an x-y grid of sensor electrodes which may be used to perform various techniques of capacitive sensing. For example, sensor electrodes 331 (331-0, 331-1, 331-2, and 331-3 visible) are arrayed along a first axis, while sensor electrodes 332 (332-0, 332-1, 332-2, and 332-3 visible) are arrayed along a second axis that is approximately perpendicular to the first axis. It should be appreciated that a dielectric layer (not illustrated) is disposed between all or portions of sensor electrodes 331 and 332 to prevent shorting. It should also be appreciated that the pattern of sensor electrodes (331, 332) illustrated in FIG. 3 has been provided an example only, that a variety of other patterns may be similarly utilized, and some of these patterns may only utilize sensor electrodes disposed in a single layer. Additionally, while the example of FIG. 3 illustrates top sensor 230-1 as being disposed beneath display 120, in other embodiments, portions of touch sensor 230-1 may be transparent and disposed either above display 120 or integrated with display 120.

In one embodiment, by performing absolute/self-capacitive sensing with sensor electrodes 331 on the first axis a first profile of any input object contacting outer surface 121 can be formed, and then a second profile of any input object contacting outer surface 121 can be formed on an orthogonal axis by performing absolute/self-capacitive sensing on sensor electrodes 332. These capacitive profiles can be processed to determine an occurrence and/or location of a user input with made by means of an input object 201 contacting or proximate outer surface 121.

In another embodiment, by performing transcapacitive/mutual capacitive sensing between sensor electrodes 331 on the first axis and sensor electrodes 332 on the second axis a capacitive image can be formed of any input object contacting outer surface 121. This capacitive image can be processed to determine occurrence and/or location of user input made by means of an input object contacting or proximate outer surface 121.

It should be appreciated that mutual capacitive sensing is regarded as a better technique for detecting multiple simultaneous input objects in contact with a surface such as outer surface 121, while absolute capacitive sensing is regarded as a better technique for proximity sensing of objects which are near but not necessarily in contact with a surface such as outer surface 121.

In some embodiments, capacitive sensing and/or another touch sensing technique may be used to sense touch input across all or a portion of the rear surface 115 of eReader 100, and/or any other surface(s) of housing 110.

Figure 4:
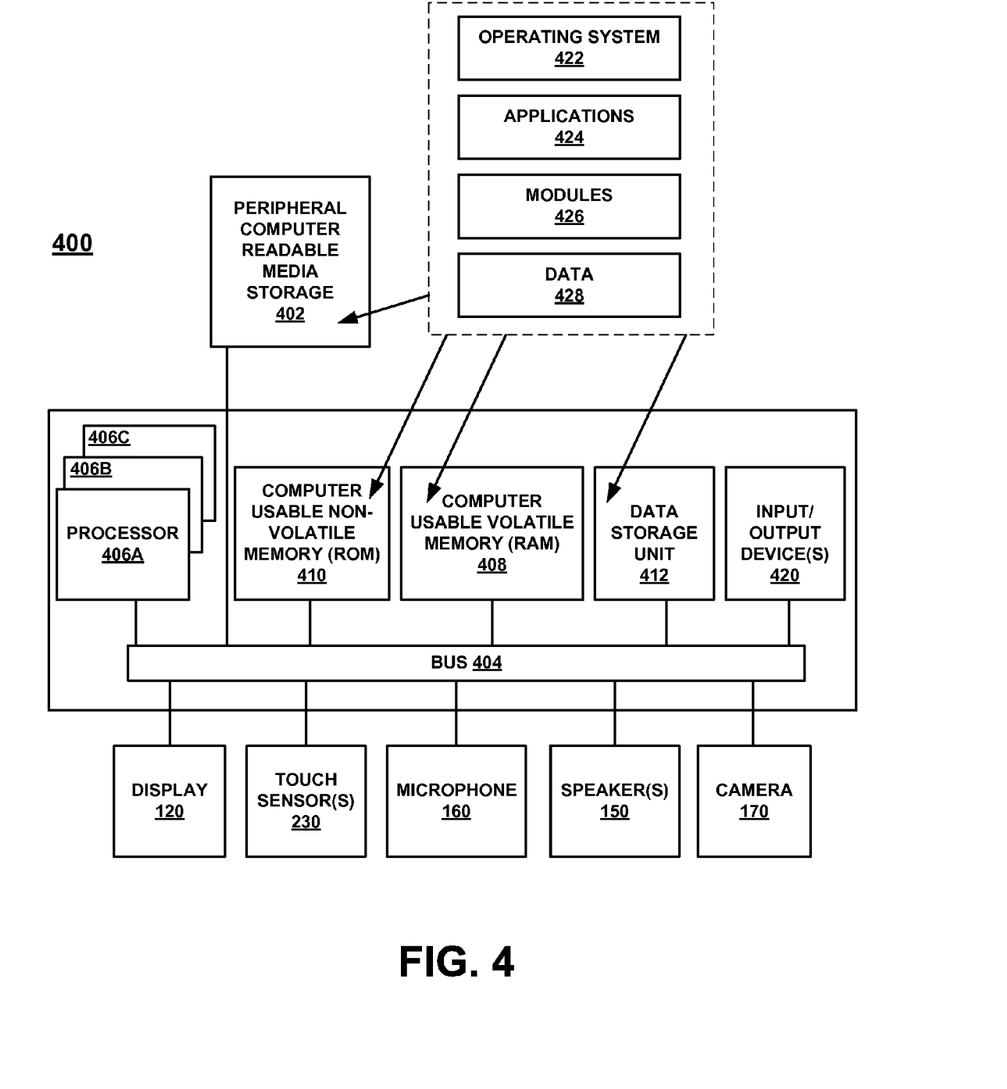
FIG. 4 shows an example computing system which may be included as a component of an eReader, according to various embodiments.

FIG. 4 shows an example computing system 400 which may be included as a component of an electronic personal display such as an eReader, according to various embodiments, and with which or upon which various embodiments described herein may operate.

Example Computer System Environment

With reference now to FIG. 4, all or portions of some embodiments described herein are composed of computer-readable and computer-executable instructions that reside, for example, in computer-usable/computer-readable storage media of a computer system. That is, FIG. 4 illustrates one example of a type of computer (computer system 400) that can be used in accordance with or to implement various embodiments of an electronic personal display. For example computer system 400 may be as a component of and/or to implement functions of an eReader, such as eReader 100, which is discussed herein. It is appreciated that computer system 400 of FIG. 4 is only an example and that embodiments as described herein can operate on or within a number of different computer systems.

System 400 of FIG. 4 includes an address/data bus 404 for communicating information, and a processor 406A coupled to bus 404 for processing information and instructions. As depicted in FIG. 4, system 400 is also well suited to a multi-processor environment in which a plurality of processors 406A, 406B, and 406C are present. Processors 406A, 406B, and 406C may be any of various types of microprocessors. For example, in some multi-processor embodiments, one of the multiple processors may be a touch sensing processor and/or one of the processors may be a display processor. Conversely, system 400 is also well suited to having a single processor such as, for example, processor 406A. System 400 also includes data storage features such as a computer usable volatile memory 408, e.g., random access memory (RAM), coupled to bus 404 for storing information and instructions for processors 406A, 406B, and 406C. System 400 also includes computer usable non-volatile memory 410, e.g., read only memory (ROM), coupled to bus 404 for storing static information and instructions for processors 406A, 406B, and 406C. Also present in system 400 is a data storage unit 412 (e.g., a magnetic or optical disk and disk drive) coupled to bus 404 for storing information and instructions.

Computer system 400 of FIG. 4 is well adapted to having peripheral computer-readable storage media 402 such as, for example, a floppy disk, a compact disc, digital versatile disc, universal serial bus "flash" drive, removable memory card, and the like coupled thereto. In some embodiments, computer-readable storage media 402 may be coupled with computer system 400 (e.g., to bus 404) by insertion into a removable storage media slot, such as removable storage media slot 180 depicted in FIGS. 1A and 1B.

System 400 also includes or couples with display 120 for visibly displaying information such as alphanumeric text and graphic images. In some embodiments, system 400 also includes or couples with one or more optional touch sensors 230 for communicating information, cursor control, gesture input, command selection, and/or other user input to processor 406A or one or more of the processors in a multi-processor embodiment. In some embodiments, system 400 also includes or couples with one or more optional speakers 150 for emitting audio output. In some embodiments, system 400 also includes or couples with an optional microphone 160 for receiving/capturing audio inputs. In some embodiments, system 400 also includes or couples with an optional digital camera 170 for receiving/capturing digital images as an input.

Optional touch sensor(s) 230 allows a user of computer system 400 (e.g., a user of an eReader of which computer system 400 is a part) to dynamically signal the movement of a visible symbol (cursor) on display 120 and indicate user selections of selectable items displayed on display 120. In some embodiment other implementations of a cursor control device and/or user input device may also be included to provide input to computer system 400, a variety of these are well known and include: trackballs, keypads, directional keys, and the like. System 400 is also well suited to having a cursor directed or user input received by other means such as, for example, voice commands received via microphone 160. System 400 also includes an input/output (I/O) device 420 for coupling system 400 with external entities. For example, in one embodiment, I/O device 420 is a modem for enabling wired communications or modem and radio for enabling wireless communications between system 400 and an external device and/or external network such as, but not limited to, the Internet. I/O device 120 may include a short-range wireless radio such as a Bluetooth® radio, Wi-Fi radio (e.g., a radio compliant with Institute of Electrical and Electronics Engineers' (IEEE) 802.11 standards), or the like.

Referring still to FIG. 4, various other components are depicted for system 400. Specifically, when present, an operating system 422, applications 424, modules 426, and/or data 428 are shown as typically residing in one or some combination of computer usable volatile memory 408 (e.g., RAM), computer usable non-volatile memory 410 (e.g., ROM), and data storage unit 412. In some embodiments, all or portions of various embodiments described herein are stored, for example, as an application 424 and/or module 426 in memory locations within RAM 408, ROM 410, computer-readable storage media within data storage unit 412, peripheral computer-readable storage media 402, and/or other tangible computer readable storage media.

Figure 5:
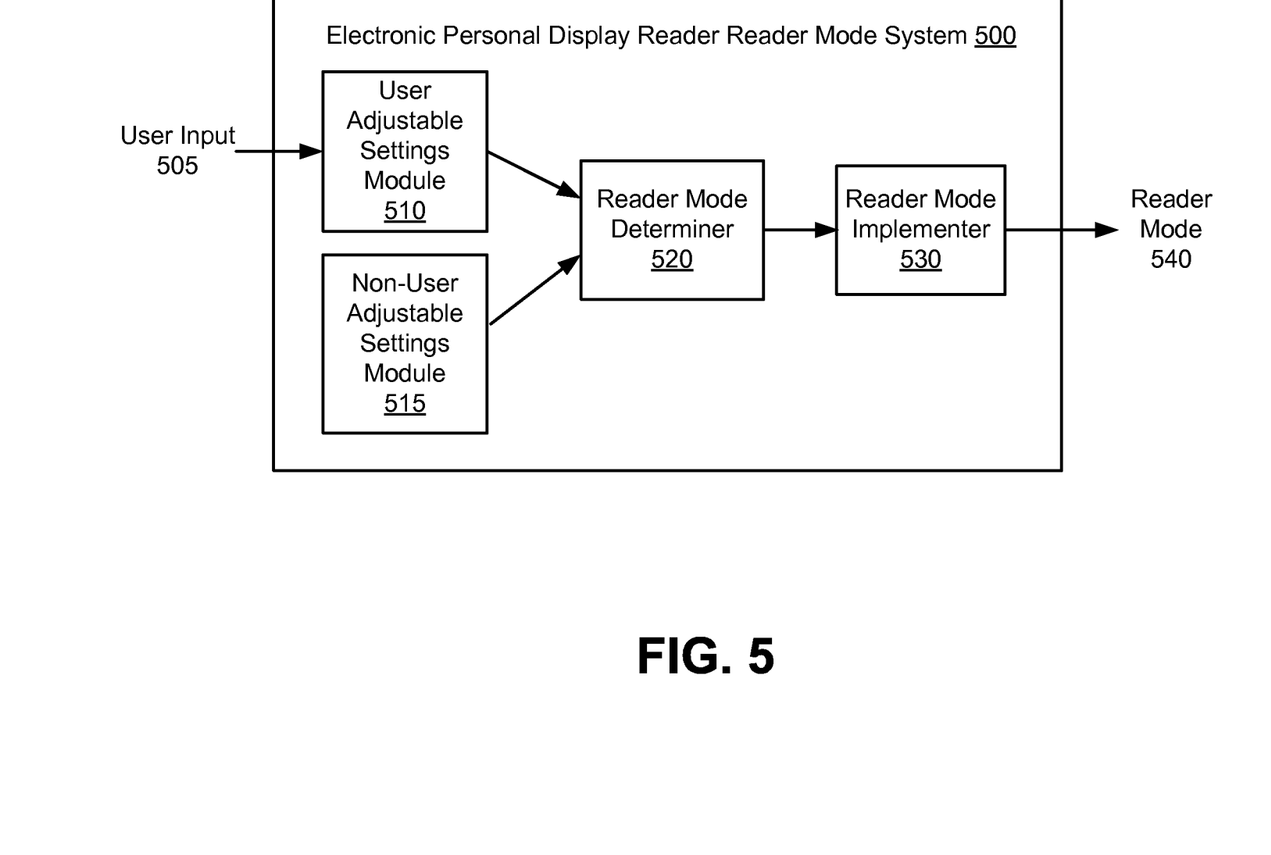
FIG. 5 shows an eReader reader mode system, in accordance with an embodiment.

Referring now to FIG. 5, an electronic personal display reader mode system 500 is shown in accordance with an embodiment. In one embodiment, reader mode system 500 includes user adjustable settings module 510, non-user adjustable settings module 515, reader mode determiner 520, and reader mode implementer 530. Although the components are shown as distinct objects in the present discussion, it is appreciated that the operations of one or more of the components may be combined into a single module. Moreover, it is also appreciated that the actions performed by a single module described herein could also be broken up into actions performed by a number of different modules or performed by a different module altogether. The present breakdown of assigned actions and distinct modules are merely provided herein for purposes of clarity.

In one embodiment, non-user adjustable settings module 515 include, but are not limited to, quelling of all notifications, disabling of web access, muting of all sounds and stopping of vibrations, alerts, reminders, ads, and the like. User adjustable settings module 510 include adjustable settings such as, but not limited to, screen brightness, font size, margin size and leading.

In one embodiment, reader mode determiner 520 determines when the electronic personal display is in reader mode. One embodiment automatically determines whether an electronic personal display, such as eReader 100, is in reader mode. For example, if eReader 100 is being used to read a book for more than a few minutes, reader mode determiner 520 may assume that the user is focused on reading and would automatically enter reader mode.

In another embodiment, a manual input is used to signal reader mode determiner 520 to enter reader mode. For example, the manual input may be received via a hard button, such as a user pressing a button designated as the reader mode. Alternatively, the manual input may be received via a capacitive sensor. For example, a user may touch a soft button or perform a gesture on the capacitive sensor to signal eReader 100 to enter reader mode.

In one embodiment, reader mode implementer 530 receives a signal from reader mode determiner 520 and activates reader mode 530. As stated herein, reader mode 530 is an optimized, personalized and distraction-free environment for reading. In one embodiment, reader mode implementer 530 may also provide an onscreen reminder that reading mode has been engaged. The reminder could include, for example, an icon in the status bar, a message or icon on the lock screen, and the like.

In one embodiment, if a user tries to perform an operation that is disabled or in conflict with reader mode 540, a reminder will be provided by reader mode implementer 530 that reading mode is enabled. In one embodiment, if the user tries to use features that are in conflict with reader mode 540, they may also be provided with an option to turn reader mode off.

Figure 6:
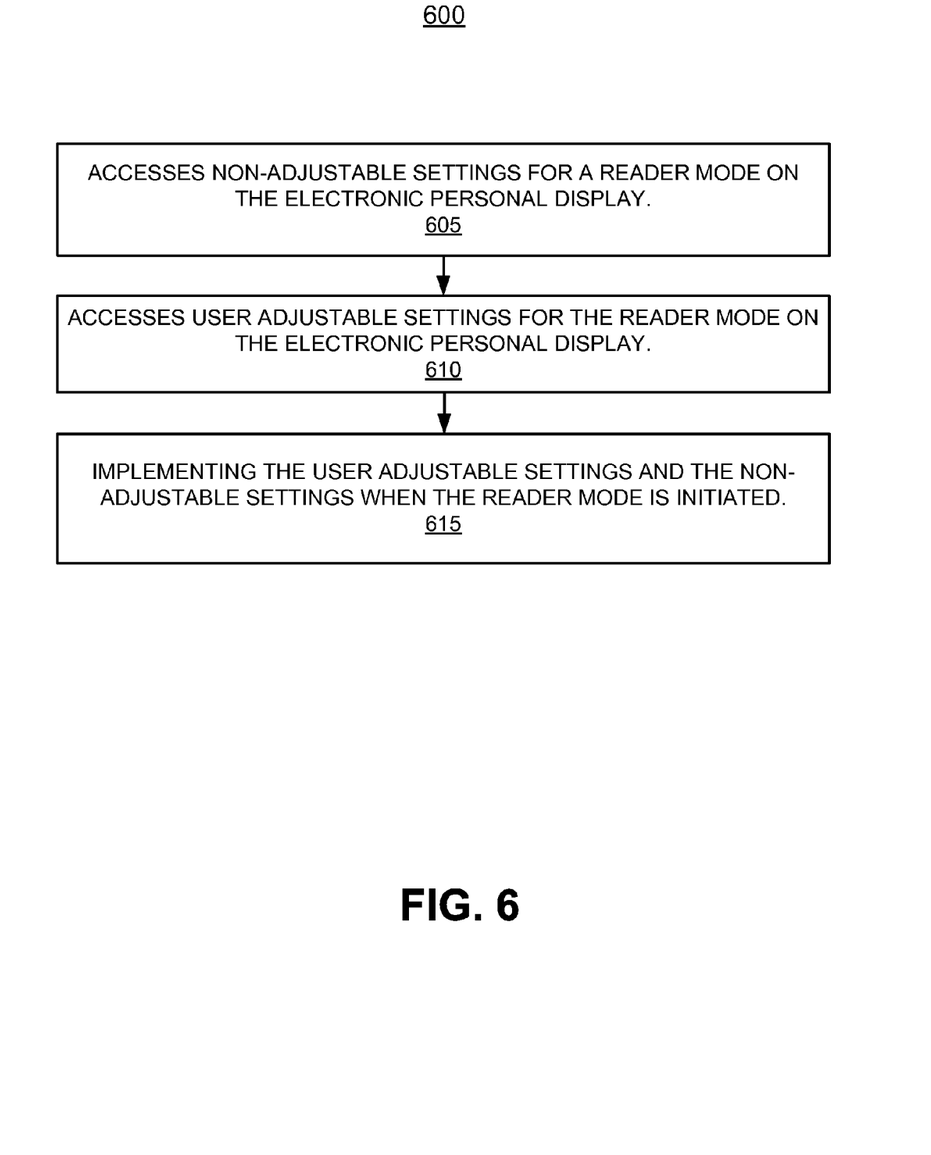
FIG. 6 illustrates a flow diagram of a method of providing a distraction free reading mode with an electronic personal display, according to various embodiments.

Example Method of Providing a Distraction Free Reading Mode with an Electronic Personal Display FIG. 6 illustrates a flow diagram 600 of a method of providing a distraction free reading mode with an electronic personal display, according to various embodiments. According to some embodiments, method 600 is performed by an electronic reader, such as eReader 100. Elements of flow diagram 600 are described below, with reference to elements of one or more of FIGS. 1-5.

With reference now to 605 of FIG. 6 and to FIG. 5, one embodiment accesses non-adjustable settings for a reader mode on the electronic personal display (e.g., eReader 100). Examples of non-adjustable settings include, but are not limited to, quelling of all notifications, disabling of web access, muting of all sounds and stopping of vibrations, alerts, reminders, ads, and the like.

Reference now to 610 of FIG. 6 and to FIG. 5, one embodiment accesses user adjustable settings for reader mode 540 on the electronic personal display (e.g., eReader 100). Examples of user adjustable settings include, but are not limited to, screen brightness, font size, margin size and leading. In general, reader mode 540 temporarily pre-empts distractions generated via the device UI.

With reference now to 615 of FIG. 6 and to FIG. 5, one embodiment implements the user adjustable settings and the non-adjustable settings when the reader mode 540 is initiated. In one embodiment, the reader mode is automatically initiated. In another embodiment, reader mode 540 is manually initiated via a user input on a hard button and/or a capacitive sensor input. Thus, reading mode is an easily accessible option that allows the reader to customize the device settings for an uninterrupted, optimized reading experience.

In one embodiment, if a user tries to perform an operation that is disabled while the reader mode 540 is engaged, a reminder is provided. For example, the reminder may be, but is not limited to an icon in a status bar, an icon on a lock screen, a message on the lock screen and the like. Moreover, if the user tries to use features that are in conflict with reader mode 540 (e.g., manually adjust brightness, go on the web with WiFi disabled, adjust volume when muted) they would be reminded that reading mode is enabled. In one embodiment, if the user tries to use features that are in conflict with reader mode 540, they will also be provided with an option to turn reader mode off.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A method for providing a distraction free reading mode with an electronic personal display, said method comprising:
    initiating a reader mode based at least upon determining that an e-book has been displayed on the electronic personal display for a first period of time, wherein the reader mode is configured to (i) permit a user to access e-book reading functions, and (ii) block the user from accessing settings and communications via the electronic reader that are otherwise available to the user during a non-reader mode;
    implementing non-user adjustable settings for the reader mode on the electronic personal display, wherein the non-user adjustable settings are settings that the user is restricted from accessing during the reader mode and is permitted to adjust when the electronic personal display is not in the reader mode;
    implementing user adjustable settings for the reader mode on the electronic personal display, wherein the user adjustable settings include the e-book reading functions and settings that the user is permitted to adjust during the reader mode;
    detecting, during the reader mode, an attempt to directly adjust the non-user adjustable settings including at least one of the settings and the communications that are available to the user only during the non-reader mode; and displaying a prompt to switch from the reader mode to the non-reader mode in response to detecting the attempt to directly adjust the non-user adjustable settings.

2. The method of claim 1 further comprising: automatically initiating the reader mode.

3. The method of claim 1 further comprising: receiving a manual input to initiate the reader mode from a hard button.

4. The method of claim 1 further comprising: receiving a manual input to initiate the reader mode from a capacitive sensor input.

5. The method of claim 1 wherein the non-user adjustable settings further comprise settings from the group consisting of: a quelling of all notifications, a disabling of web access, a muting of all sounds and a stopping of alerts and vibrations.

6. The method of claim 1 wherein the user adjustable settings are selected from the group consisting of: a screen brightness, a font size, a margin size and a leading setting.

7. The method of claim 1 further comprising: providing a reminder that reading mode is engaged.

8. The method of claim 7 wherein the reminder is selected from the group consisting of: an icon in a status bar, an icon on a lock screen and a message on the lock screen.

9. An electronic reader comprising:
circuitry configured to:
provide user adjustable settings that a user is permitted to adjust during a reader mode, wherein the user adjustable settings include e-book reading functions;
provide non-user adjustable settings that the user is restricted from accessing during the reader mode and is permitted to adjust when the electronic reader is not in the reader mode;
initiate the reader mode based at least upon determining that an e-book has been displayed on the electronic reader for a first period of time, wherein the reader mode is configured to (i) permit the user to access the e-book reading functions, and (ii) block the user from accessing settings and communications via the electronic reader that are otherwise available to the user during a non-reader mode;
implement the user adjustable settings and the non-user adjustable settings when the electronic reader is in the reader mode;
detect, during the reader mode, an attempt to directly adjust the non-user adjustable settings including at least one of the settings and the communications that are available to the user only during the non-reader mode, and
display a prompt to switch from the reader mode to the non-reader mode in response to detecting the attempt to directly adjust the non-user adjustable settings.

10. The electronic reader of claim 9 wherein the circuitry is further configured to determine when the reader mode is selected from the group of detection methods consisting of: an automatic detection, a manual input from a hard button input, and a manual input from a capacitive sensor input.

11. The electronic reader of claim 9 wherein the non-user adjustable settings further comprise settings from the group consisting of: a quelling of all notifications, a disabling of web access, a muting of all sounds and a stopping of alerts and vibrations.

12. The electronic reader of claim 9 wherein the user adjustable settings are selected from the group consisting of: a screen brightness, a font size, a margin size and a leading setting.

13. The electronic reader of claim 9 further comprising: a reminder module to provide a notification that the electronic reader is in reading mode.

14. The electronic reader of claim 13 wherein the notification is selected from the group consisting of: an icon in a status bar, an icon on a lock screen and a message on the lock screen.

15. A method for providing a distraction free reading mode with an electronic reader, said method comprising:
initiating a reader mode based at least upon determining that an e-book has been displayed on the electronic reader for a first period of time, wherein the reader mode is configured to (i) permit a user to access e-book reading functions, and (ii) block the user from accessing settings and communications via the electronic reader that are otherwise available to the user during a non-reader mode;
implementing non-user adjustable settings for the reader mode on the electronic reader, wherein the non-user adjustable settings are settings that the user is restricted from accessing during the reader mode and is permitted to adjust when the electronic reader is not in the reader mode; and
implementing user adjustable settings for the reader mode on the electronic reader, wherein the user adjustable settings include the e-book reading functions and settings that the user is permitted to adjust during the reader mode;
detecting, during the reader mode, an attempt to directly adjust the non-user adjustable settings including at least one of the settings and the communications that are available to the user only during the non-reader mode; and
displaying a prompt to switch from the reader mode to the non-reader mode in response to detecting the attempt to directly adjust the non-user adjustable settings.

16. The method of claim 15 further comprising: automatically initiating the reader mode.

17. The method of claim 15 further comprising: receiving a manual input to initiate the reader mode from the group consisting of: a hard button and a capacitive sensor input.

18. The method of claim 15 wherein the non-user adjustable settings when the reader mode is activated further comprise settings from the group consisting of: a quelling of all notifications, a disabling of web access, a muting of all sounds, and a stopping of alerts and vibrations.

19. The method of claim 15 wherein the user adjustable settings when the reader mode is activated are selected from the group consisting of: a screen brightness, a font size, a margin size and a leading setting.

20. The method of claim 15 wherein the reminder is selected from the group consisting of: an icon in a status bar, an icon on a lock screen and a message on the lock screen.

21. The method of claim 1, further comprising:
detecting an attempt to adjust at least one of the non-user adjustable settings during the reader mode; and
displaying an indicator that the reader mode is activated and an option to turn the reader mode off.

22. The method of claim 1, further comprising:
displaying a reminder indicating that the reader mode is enabled in addition to the prompt to switch from the reader mode to the non-reader mode in response to detecting the attempt to directly adjust the non-user adjustable settings.

* * * * *